United States Patent [19]

Worcester

[11] Patent Number: 4,548,663
[45] Date of Patent: Oct. 22, 1985

[54] CONVEYOR BELT SPLICING

[75] Inventor: Winthrop S. Worcester, Akron, Ohio

[73] Assignee: The B. F. Goodrich Company, Akron, Ohio

[21] Appl. No.: 587,472

[22] Filed: Mar. 8, 1984

[51] Int. Cl.⁴ .............................. B31F 5/00
[52] U.S. Cl. .................... 156/159; 156/140; 156/245; 156/258; 156/266; 264/46.5; 264/261
[58] Field of Search ............. 156/137, 159, 158, 157, 156/51, 502, 304.1, 245, 258, 266, 140; 24/38; 198/844; 474/253, 254; 428/58; 264/45.9, 46.1, 45.8, 46.7, 165, 46.5, 152, 261

[56] References Cited

U.S. PATENT DOCUMENTS

| 3,234,611 | 2/1966 | Paasche | 474/254 X |
| 3,487,871 | 1/1970 | Kanamori | 24/38 X |
| 3,871,935 | 3/1975 | Gloge et al. | 156/158 |
| 3,929,026 | 12/1975 | Hofmann | 156/140 X |

Primary Examiner—Edward Kimlin
Assistant Examiner—Ramon R. Hoch
Attorney, Agent, or Firm—Joseph Januszkiewicz

[57] ABSTRACT

A method for splicing belt ends of an endless belt, as in the field, wherein uniform tension is provided to the reinforcing members such as strands or cables in the spliced section. The respective spaced ends or sections have all belting material removed leaving each end with a laterally extending end section spaced from its adjacent main body section of the belt and interconnected only by the cable. The dressed end sections are overlapped and thence the center section of the overlapped portions are cast into a belt section with cables embedded therein. The laterally extending end sections are cut leaving two uncast sections which are then cast or molded to encapsulate the remaining bare cables to form a continuous belt by such splicing.

8 Claims, 12 Drawing Figures

CONVEYOR BELT SPLICING

BACKGROUND OF THE INVENTION

The present invention relates to cord or cable construction belting, and more particularly to an improved splicing between the ends of two reinforced belt portions. The invention also relates to a method of splicing the ends of a conveyor belt which are reinforced by strands such as metallic wires, cables or cords.

In transmission and conveyor belts having longitudinally extending reinforcing members of metallic cords or cables, it has been difficult to splice two together or to form an endless belt to provide uniform tension within the cords. Splicing of such belts is particularly difficult when it is necessary to do so in the field. The present invention provides a new and novel method for splicing the belt ends while maintaining a high degree of uniformity of tension among the cords or cables and yet retain its flexibility to enable the belt to track properly over pulleys. Such method is available for use in the field of operation providing a strong effective splice.

SUMMARY OF THE INVENTION

The present invention provides a unique method for splicing the end portions of an endless belt particularly in the field wherein it is necessary to provide uniformity of tension in the reinforcing members such as the strands of cables or cords. The respective spaced ends or end sections are each routed to provide a laterally extending edge portion spaced from the main body of the end portions. Such prepared or dressed end sections are overlapped and thence only a center section of the overlapped portions are cast or molded with the respective reinforcing cables or strands uniformly spaced and tensioned. Therafter the respective laterally extending edge portions are cut leaving two spaced uncast or sections of the belt that are then cast or molded to encapsulate the cables to form a continuous belt or splice.

DETAILED DESCRIPTION

Figure 1:
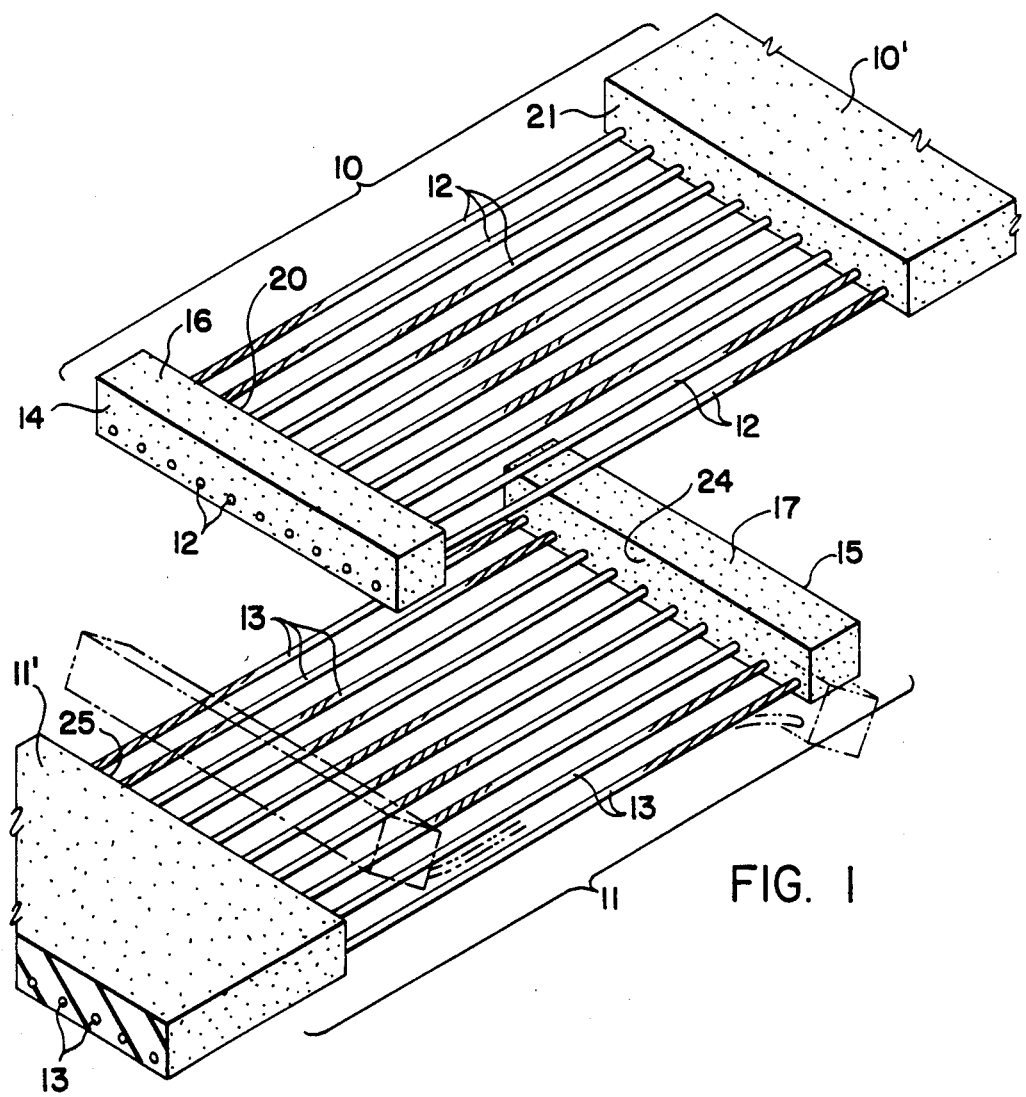
FIG. 1 is a perspective view of a pair of end sections of a conveyor belt showing a portion of each section routed out to expose the parallel reinforcing cables and the respective edge portions.

Referring to the drawings wherein like reference numerals designate like or corresponding parts throughout the several views there is shown in FIG. 1 a pair of spaced end sections 10 and 11 of an elongated belt consisting of urethane material with or without fabric over or under the main reinforcement or both and having cord or cables 12 and 13 respectively extending along the lower depth of the belt and in laterally spaced-apart relation.

The respective two ends of belt sections 10 and 11 are suitably sheared at the respective edges leaving a pair of end faces 14 and 15. The respective ends of strands 12 and 13 are thus cut clean. The respective spaced end sections 10 and 11 of the belt have the urethane filler material removed as by routing leaving a pair of end portions 16 and 17 with end faces 14 and 15 thereon and also leaving the main body portion 10' and 11' of the belts with newly formed outer end faces 21 and 25 thereon with bare strands 12 and 13 therebetween. In this operation the strands are stripped of the belt covering and filler materials. Such end portion 16 has an inner face 20 that is opposite the newly formed outer face 21 of the main body position 10' of end section 10. The space between the inner face 20 and outer face 21 of the end portions 16 is the above referred to portion that is routed and has the cables 12 interconnecting the end portion 16 to the main body 10' of the belt end section 10. In a similar manner the end portion 17 has the end face 15 as an outer face opposite an inner face 24 on the main body portion 11' of end section 11. The space between inner face 24 and the newly formed outer face 25 is the above referred to portion that is routed and has the cables 13 interconnecting the end portion 17 and the main body 11' of the belt end section 11.

Figure 2:
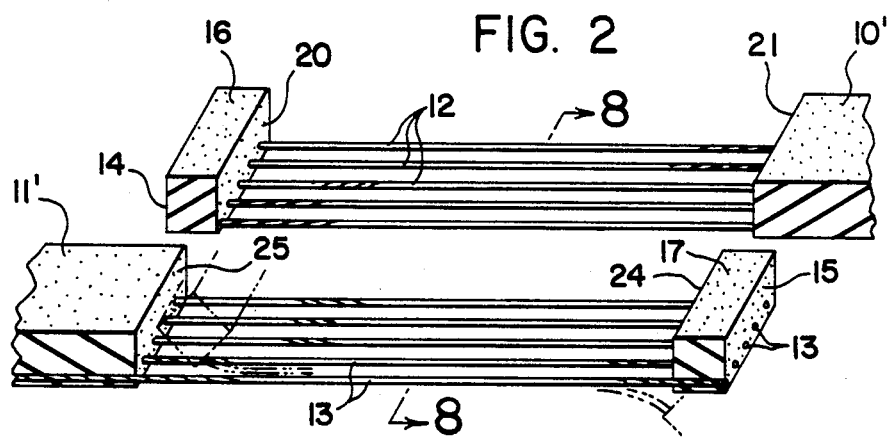
FIG. 2 is a perspective view of a pair of end sections substantially in vertically aligned position in preparation for overlapping the edge portions and the respective cables.
Figure 3:
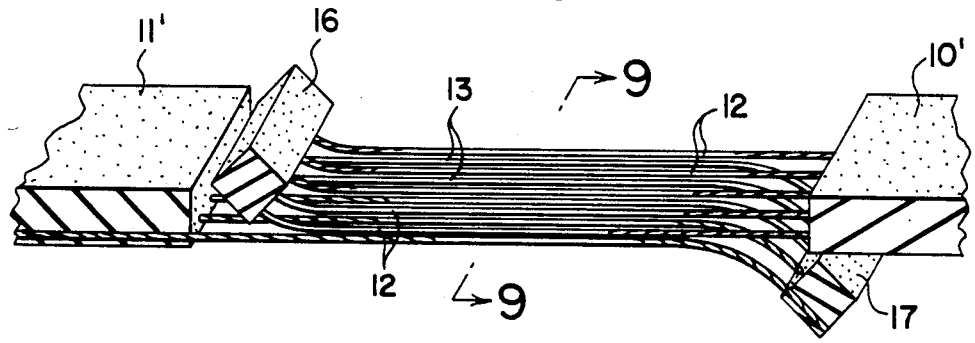
FIG. 3 is a perspective view of the pair of end sections of the conveyor belt in overlapping condition with the respective edge portions deflected but with the stripped cables substantially tensioned and in parallel relationship.
Figure 4:
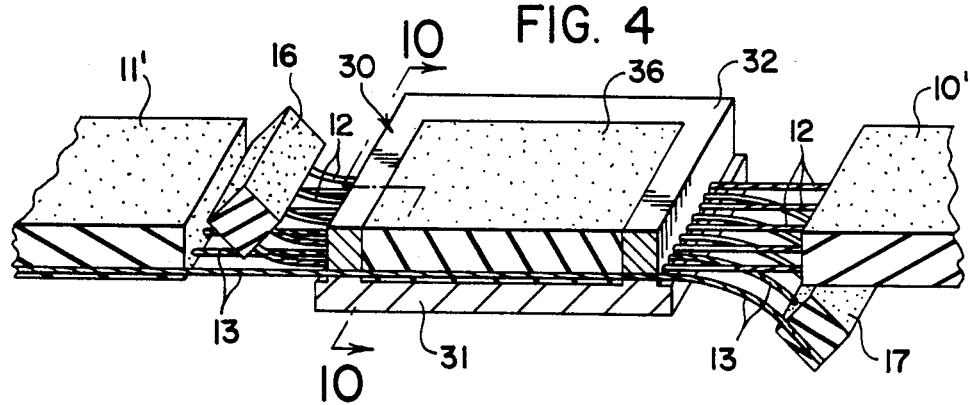
FIG. 4 is a perspective view of the pair of end sections of the conveyor belt in overlapping condition with the center lapped portion supported in a mold and cast to retain the cables in their normal positon.
Figure 5:
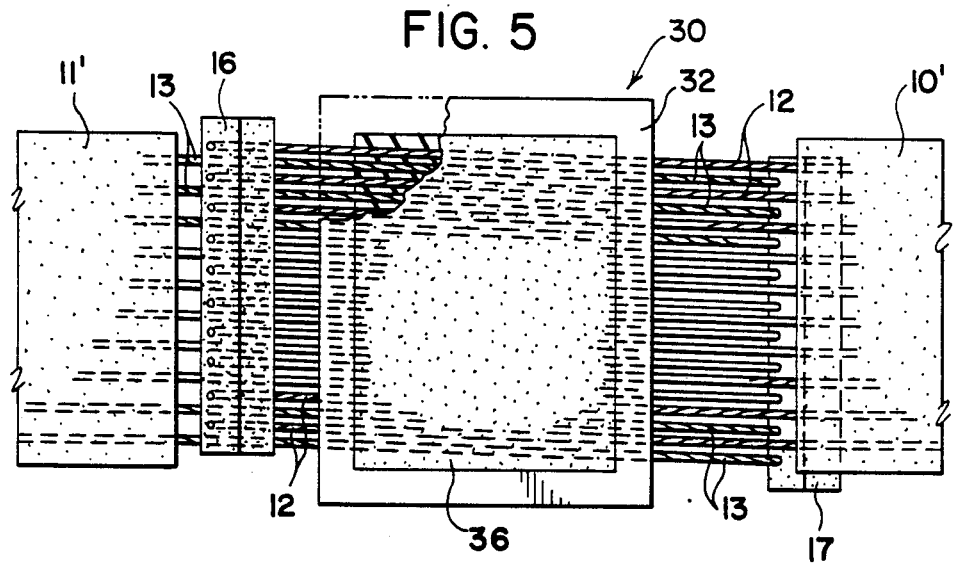
FIG. 5 is a plan view of the pair of end sections of the conveyor belt in overlapped condition with the center lapped portion supported in a mold, a portion of which is broken away to illustrate the molded portion of the belt and the respective edge portions.
Figure 6:
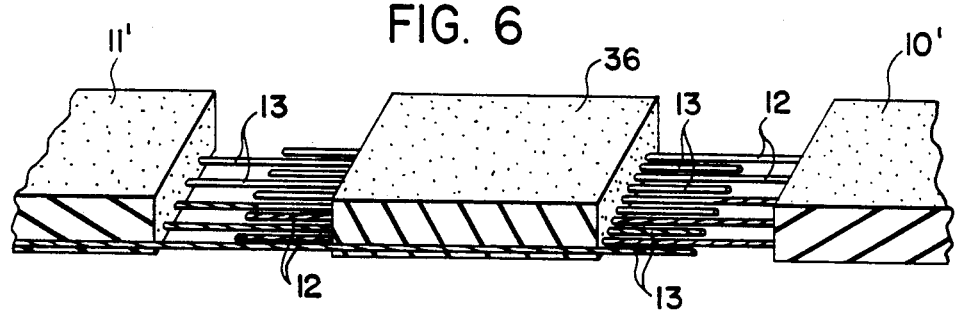
FIG. 6 is a perspective view of the pair of end sections of the conveyor belt with the center lapped portion cast and with the respective edge portions severed to permit alignment of the stripped reinforcing cables.
Figure 7:
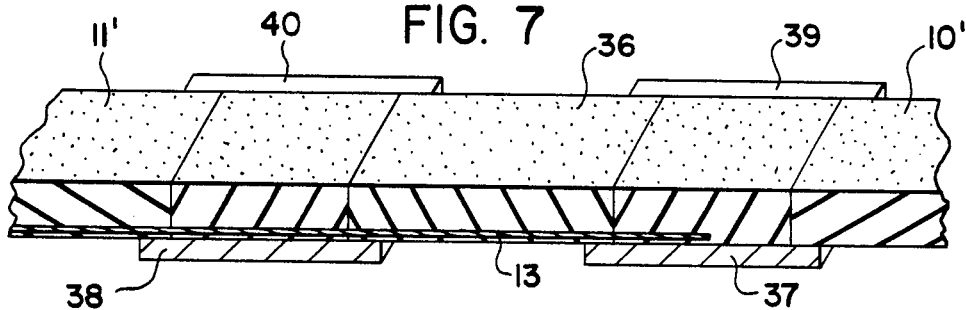
FIG. 7 is a perspective view of the pair of end sections of the conveyor belt fully cast illustrating the center cast portion and the spaced cast portions integral therewith.
Figure 8:
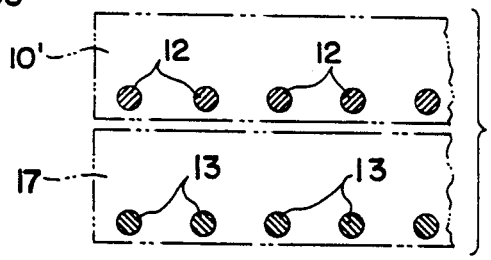
FIG. 8 is a cross-sectional view of a portion of the end sections of the conveyor belt taken on line 8—8 of FIG. 2.
Figure 9:
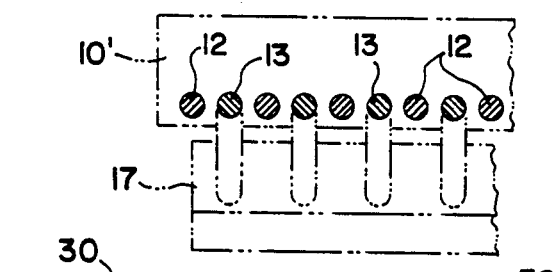
FIG. 9 is a cross-sectional view of a portion of the end sections of the conveyor belt taken on line 9—9 of FIG. 3, also showing in phantom lines a portion of the mold in which such center section of the belt is cost or molded.
Figure 10:
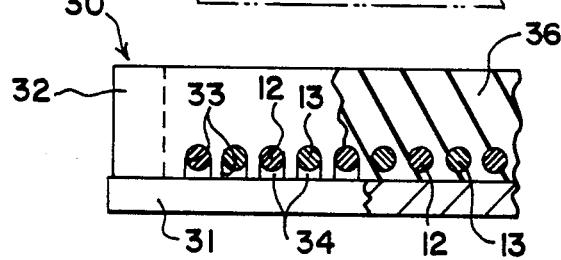
FIG. 10 is a cross-sectional view of a portion of the center cast section of the conveyor belt along with a portion of the mold taken on line 10—10 of FIG. 4.

The respective end sections 10 and 11 of the conveyor belt are then positioned in vertical longitudinal alignment as shown in FIG. 2 such that the outer face 14 of end portion 16 is closely adjacent to and in vertical planer alignment with outer face 25 of main body portion 11' and outer end face 15 of end portion 17 is in vertical alignment with but below outer face 21 of end section 10. The respective end sections 10 and 11 are then brought into longitudinal alignment with the end portion 16 tilted upwardly, the end portion 17 tilted downwardly and with the cables 12 and 13 in the same horizontal plane. The cables 12 and 13 are arranged in side by side relationship alternating the respective cables 12 and 13. A two piece mold 30 is then placed around the center portion of the routed out section of the belt, with the lower portion of the mold 31 defining a flat planar surface and the upper portion of the mold 32 defining a rectangular shaped opening which is to receive the molten urethane. The top surface of such mold 32 is at the same level as the belt sections 10 and 11. Mold section 32 has a plurality of slots 33 to accommodate the parallel extending cables 12 and 13. Lower mold 31 has plurality of upwardly extending projections 34 that complementary engage the slots 33 and cooperate therewith to permit the cables 12 and 13 to extend through the mold while positioning such cables above the flat planar surface of the lower mold section 31 the same distance that such cables are above the lower surface of the belt sections 10 and 11. Such mold sections 31 and 32 are then filled with melted urethane to anchor and encapsulate the cables 12 and 13 and form a center belt portion 36. The respective end portions 16 and 17 are severed from the belt thus leaving the free ends of cables 12 and 13 (FIG. 6). The mold sections 31 and 32 are removed and thereafter the partially spliced portion is placed into a molding device that is shown schematically in FIG. 7 wherein the respective portions 10' and 11' rest on a bottom mold section 37 and 38 respectively. Mold section 37 has a pair of vertically extending side sections 39 (only one shown) that are flush with the respective sides of the belt end portion 10' and the center belt portion 36. Similarly a mold section 38 has a pair of vertically extending side sections 40 (only one shown) that are flush with the respective sides of belt portion 11' and the center belt portion 36. Such mold sections 37, 38, 39 and 40 are then filled with urethane and allowed to cure to provide a continuous uniform thick conveyor belt joining former end sections 10 and 11.

Figure 11:
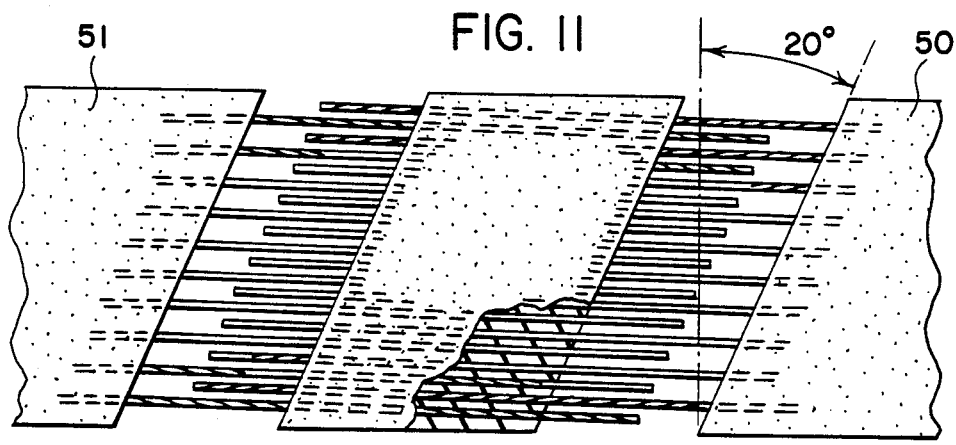
FIG. 11 is a plan view of a modified form of the splicing of the end sections of a conveyor belt showing a cast center section and the stripped cables similar to FIG. 6.

A modification of the invention is shown in FIG. 11 which is similar in disclosure to that of FIG. 6 of the first embodiment. The main distinction between these inventions is that the modification has the respective end sections 50 and 51 cut at a bias angle of approximately twenty degrees rather than have the cut or routed portion normal to the sides of the belt. In this manner the splice is distributed over a greater area to eliminate stress concentrations.

Figure 12:
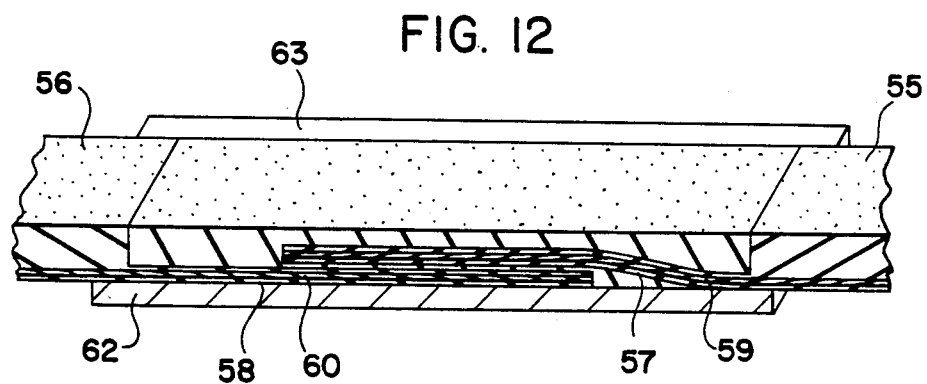
FIG. 12 is a cross-sectional perspective view of a further modified form of the splicing of the end sections of a conveyor belt with the cables not fully stripped of the belt material.

A further modification is shown in FIG. 12 wherein the cables are not stripped fully but rather the respective end portions 55 and 56 of the conveyor belt are routed to leave a thin layer of belting material such as 57 and 58 respectively with the cables 59 and 60. In this example the respective end portions 55 and 56 are suitably clamped and held on a mold with a bottom plate 62 and two side plates 63 (only one shown) wherein such side plates 63 extend upwardly to where their top edge terminates at the same level as the top surface of the conveyor belt. Urethane is then poured into such to form a continuous upper and lower surface with belt portions 55 and 56.

It will be apparent that, although a specific embodiment and certain modifications of the invention has been described in detail, the invention is not limited to the specifically illustrated and described constructions since variations may be made without departing from the principles of the invention.

I claim:

1. The method of joining the end sections of conveyor belts formed of urethane filler material and having an end face at each section with a plurality of strands embedded therein and extending in a lengthwise directions of the belt comprising the steps of removing filler material out of one end section of one of said belts to be spliced to form a first end portion retaining one of said end faces thereon connected via strands to the main body portion of said one end section having a newly formed outer end face thereon; removing filler material out of the other one of said end sections of said belts to form a second end portion retaining the other one of said end faces thereon and connected via bare strands to the main body portion of the other end sections having a newly formed outer end face; overlapping said end sections to align said strands and with said first end portion adjacent said newly formed outer end face of said second end portion and with said second end portion adjacent said newly formed outer end face of said one end section; pouring a urethane molded belt section between said newly formed outer end faces that is spaced therefrom but encapsulates a portion of said laterally spaced strands to define a center belt section; cutting off both of said end portions; aligning the remaining bare strands into parallel relationship; and pouring urethane molded belt sections between said center belt section and said newly formed outer end faces to form a continuous belt splice between said end sections of said belts.

2. The method of joining the end sections of conveyor belts as set forth in claim 1 wherein the aligning of said strands is in side by side parallel relationship.

3. The method of joining the end sections of conveyor belts as set forth in claim 2 wherein the strands of each end section terminate adjacent opposite outer end faces thereby extending substantially the full length of said overlapped end sections.

4. The method of joining the end sections of conveyor belts as set forth in claim 3 wherein the gap between said strands in each end section is greater than twice the thickness of said strands.

5. The method of joining the end sections of conveyor belts as set forth in claim 4 wherein the removing of said urethane filler material is done to provide a bias angle in said newly formed outer end face and said end portions are angularly disposed.

6. A method of splicing the ends of a conveyor belt formed of a urethane filler material and having strands embedded therein extending in a lengthwise direction of the belt comprising the steps of shearing the respective ends of said belt to provide a pair of end faces, removing said filler material from each of said belt ends beginning from a portion spaced from said end face to a newly formed outer face interconnected by bare strands defining a belt end section interconnected by said strands to the main body of said belt which begins at said newly formed outer face, overlapping said belt ends to position and align said bare strands in side by side relationship, pouring a urethane molded belt section in said overlapped and aligned portion of said belt ends that contain bare strands to encapsulate said strands to form a outer belt section that is spaced from said newly formed outer faces, cutting off both of said belt end sections, aligning the remaining bare strands in side by side relationship, and pouring urethane molded belt sections between said center belt section and said newly formed outer faces to form a continuous spliced belt section that is continuous with said conveyor belt.

7. The method of splicing the ends of a conveyor belt as set forth in claim 6 wherein said overlapping of said belt ends has one of said belt end sections deflected upwardly above said aligned strands and the other one of said belt end sections deflected downwardly below said aligned strands.

8. The method of splicing the ends of a conveyor belt as set forth in claim 7 wherein said shearing of said respective ends of said belt is done at a bias angle, and said removing of belting material provides a bias angle on the respective sides of said newly formed outer faces and said end sections.

* * * * *